(12) United States Patent  (10) Patent No.: US 8,045,519 B2
Kuchibhotla et al.  (45) Date of Patent: Oct. 25, 2011

(54) SCHEDULING IN WIRELESS COMMUNICATION SYSTEMS

(75) Inventors: Ravi Kuchibhotla, Gurnee, IL (US); Robert T. Love, Barrington, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 63 days.

(21) Appl. No.: 12/574,487

(22) Filed: Oct. 6, 2009

(65) Prior Publication Data

US 2010/0020716 A1  Jan. 28, 2010

Related U.S. Application Data

(63) Continuation of application No. 11/243,033, filed on Oct. 4, 2005, now Pat. No. 7,616,610.

(51) Int. Cl.
*H04W 4/00* (2009.01)
(52) U.S. Cl. .................. 370/329; 370/330; 370/335
(58) Field of Classification Search .................. 370/310, 370/328, 329, 330, 331, 335, 336, 337, 338; 455/450, 421, 452, 453
See application file for complete search history.

(56) References Cited

U.S. PATENT DOCUMENTS

| | | | |
|---|---|---|---|
| 4,817,190 A | 3/1989 | Comroe et al. | |
| 5,014,345 A | 5/1991 | Comroe et al. | |
| 5,483,672 A * | 1/1996 | Sasuta | 455/509 |
| 5,530,914 A | 6/1996 | McPheters | |
| 5,946,306 A | 8/1999 | Talarmo | |
| 6,115,390 A | 9/2000 | Chuah | |
| 6,219,341 B1 | 4/2001 | Varanasi | |
| 6,327,254 B1 | 12/2001 | Chuah | |
| 6,427,075 B1 | 7/2002 | Burg et al. | |
| 6,473,467 B1 | 10/2002 | Wallace et al. | |
| 6,744,743 B2 | 6/2004 | Walton et al. | |
| 6,765,969 B1 | 7/2004 | Vook et al. | |
| 6,804,528 B1 | 10/2004 | Laroia et al. | |
| 6,845,100 B1 | 1/2005 | Rinne | |
| 6,850,540 B1 | 2/2005 | Peisa et al. | |
| 6,859,443 B1 | 2/2005 | Mushkin | |
| 6,963,544 B1 * | 11/2005 | Balachandran et al. | 370/281 |
| 7,088,671 B1 | 8/2006 | Monsen | |
| 7,110,349 B2 | 9/2006 | Branlund et al. | |

(Continued)

FOREIGN PATENT DOCUMENTS

EP  0619662 A2  10/1994

(Continued)

OTHER PUBLICATIONS

U.S. Appl. No. 11/392,077 Non-Final Rejection dated Aug. 11, 2010, 27 pages.

(Continued)

*Primary Examiner* — Jean Gelin
(74) *Attorney, Agent, or Firm* — Roland K. Bowler, II

(57) ABSTRACT

A method in a wireless communication network (100) wherein information is communicated in a frame structure wherein each frame includes multiple sub-frames, including grouping at least two wireless communication terminals in a group, assigning the group to less than all sub-frames constituting a communication frame, and assigning a radio resource assignment control channel of one or more assigned sub-frames to the group. The control channel is used to assign radio resources to one or more terminals of the group.

12 Claims, 4 Drawing Sheets

U.S. PATENT DOCUMENTS

| | | |
|---|---|---|
| 7,400,898 B2 | 7/2008 | Kang et al. |
| 7,423,997 B2 | 9/2008 | Kuchibhotla et al. |
| 7,471,932 B2 | 12/2008 | Wu et al. |
| 7,570,596 B2 | 8/2009 | Pan et al. |
| 2002/0114309 A1 | 8/2002 | Chow et al. |
| 2003/0013451 A1 | 1/2003 | Walton |
| 2003/0063619 A1 | 4/2003 | Montano et al. |
| 2003/0086366 A1 | 5/2003 | Branlund et al. |
| 2003/0220119 A1 | 11/2003 | Terry |
| 2004/0082356 A1 | 4/2004 | Walton et al. |
| 2005/0007990 A1 | 1/2005 | Beckmann et al. |
| 2005/0073976 A1 | 4/2005 | Fujii |
| 2005/0105487 A1 | 5/2005 | Rudolf et al. |
| 2005/0122999 A1 | 6/2005 | Scherzer et al. |
| 2005/0141467 A1 | 6/2005 | Pan et al. |
| 2005/0286402 A1 | 12/2005 | Byun et al. |
| 2006/0002336 A1* | 1/2006 | Stanwood et al. ............ 370/328 |
| 2006/0013185 A1 | 1/2006 | Seo et al. |
| 2006/0092972 A1 | 5/2006 | Petrovic et al. |
| 2006/0093067 A1 | 5/2006 | Jalali et al. |
| 2006/0146863 A1 | 7/2006 | Spinar et al. |
| 2006/0153312 A1 | 7/2006 | Yun et al. |
| 2006/0274779 A1 | 12/2006 | Shoham |
| 2007/0010268 A1 | 1/2007 | Kim et al. |
| 2007/0053288 A1* | 3/2007 | Stern-Berkowitz et al. .. 370/229 |
| 2007/0117579 A1 | 5/2007 | Cai et al. |
| 2007/0153690 A1 | 7/2007 | Stanwood et al. |
| 2007/0230412 A1 | 10/2007 | McBeath et al. |
| 2008/0305819 A1 | 12/2008 | Chun et al. |
| 2010/0309891 A1* | 12/2010 | Kuchibhotla et al. ......... 370/336 |

FOREIGN PATENT DOCUMENTS

| | | |
|---|---|---|
| EP | 0660633 A2 | 12/1994 |
| EP | 1005243 A1 | 5/2000 |
| WO | 0197539 A2 | 12/2001 |
| WO | 2004075495 A1 | 9/2004 |
| WO | 2004100566 A2 | 11/2004 |

OTHER PUBLICATIONS

3GPP; ETSI TS 125 308 V6.3.0 (Dec. 2004) Technical Specification; Universal Mobile Telecommunications System (UMTS); Utra High Speed Downlink Packet Access (HSDPA); Overall Description; Stage 2 (3GPP TS 25.308 Version 6.3.0 Release 6).

3GPP; ETSI TS 125 309 V6.4.0 (Sep. 2005) Technical Specification; Universal Mobile Telecommunicaitons System (UMTS); FDD Enhanced Uplink; Overall Description; Stage 2 (3GPP TS 25.309 Version 6.4.0. Release 6).

Cohen et al., Scheduling of Voice Packets in a Low-Bandwidth Shared Medium Access Network; Department of Computer Schience Technion Israel; 23 Pages, Mar. 2003.

Cohen et al., A Generic Quantitative Approach to Scheduling of Synchronous Packets in a Shared Medium Wireless Access Network.; 11 Pages, Jul. 2004.

Howon Lee, et al., Extended RTPS for VOIP Services; IEEE 802.16 Broadband Wireless Access Working Group; IEEE C802.16e-04/522; 8 Pages; Nov. 4, 2004.

Farooq Khan, VoIP Models for 802.20 System Performance Evaluation [Retrieved from IEEE 802 LAN/MAN Standards Committee, URL: www.ieee802.org/20/Contribs/C802.20.04-12.ppt.], IEEE 802.20 Interim Meeting, Jan. 12, 2004.

Banani Roy, Dynamic Subchannel Allocation in a Multi-Cellular OFDMA System based on Interference Measurements and Traffic Situation [Retrieved from Queen's University, <Url:http://www.cs.queensu.ca/-broy/MasterThesis_Banani.pdf>], Master Thesis, Dec. 14, 2005.

* cited by examiner

SCHEDULING IN WIRELESS COMMUNICATION SYSTEMS

CROSS REFERENCE TO RELATED APPLICATIONS

The present application is a continuation of co-pending U.S. application Ser. No. 11/243,033 filed on 4 Oct. 2005 from which benefits are claimed under 35 U.S.C. 120 and the contents of which are hereby incorporated by reference.

FIELD OF THE DISCLOSURE

The present disclosure relates generally to wireless communications and, more particularly, to scheduling mobile terminals in wireless communication systems and corresponding methods.

BACKGROUND

In wireless communication systems, it is desirable to reduce overhead associated with signaling for voice and data services, system information, control, etc. In traditional GSM and UMTS systems, bearer establishment is enabled through dedicated signaling. The bearer defines radio parameters, for example, time slot, frequency, code, etc., associated with a channel during a call. In voice communications for example a dedicated channel is assigned to each user. In High Speed Downlink Packet Access (HSDPA) systems, transport format and modulation/coding parameters (TFRI) are provided using dedicated control signaling on a shared control channel, wherein the shared control channel also signals the code channel assigned to the user.

In some data only (DO) systems, voice is served over IP (VoIP). It is known to improve such systems for VoIP traffic using hybrid automatic repeat request (HARQ) error correction schemes and smaller packet sizes. While VoIP users have the same benefits of advanced link adaptation and statistical multiplexing as data users, the greatly increased number of users that may be served because of the smaller voice packet sizes places a burden on control and feedback mechanisms of the system. It can be easily envisioned, for example, that 30 times as many voice packets could be served in a given frame than data packets. There are typically about 1500 bytes for data and about 40-50 bytes for voice. Present resource allocation and channel quality feedback and acknowledgment mechanisms however are not designed to handle such a large number of allocations.

In 802.16e systems, it is known to use a telescoping control channel that expands to include as many assignments as necessary for resource allocation. However, such an expansion mechanism does not address feedback or the fact that the entire downlink may be consumed for control information. Another mitigating mechanism is to group several voice packets together for transmission to a particular user. Unfortunately, this sort of packaging mechanism can adversely affect speech quality when a transmission is not received, since longer periods of speech are lost or corrupted. Thus there is a need for increasing the number of VoIP users supported while reducing control and feedback overhead. In packet based systems the term "data" is meant to signify payload information for any service, voice or data.

The various aspects, features and advantages of the present disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
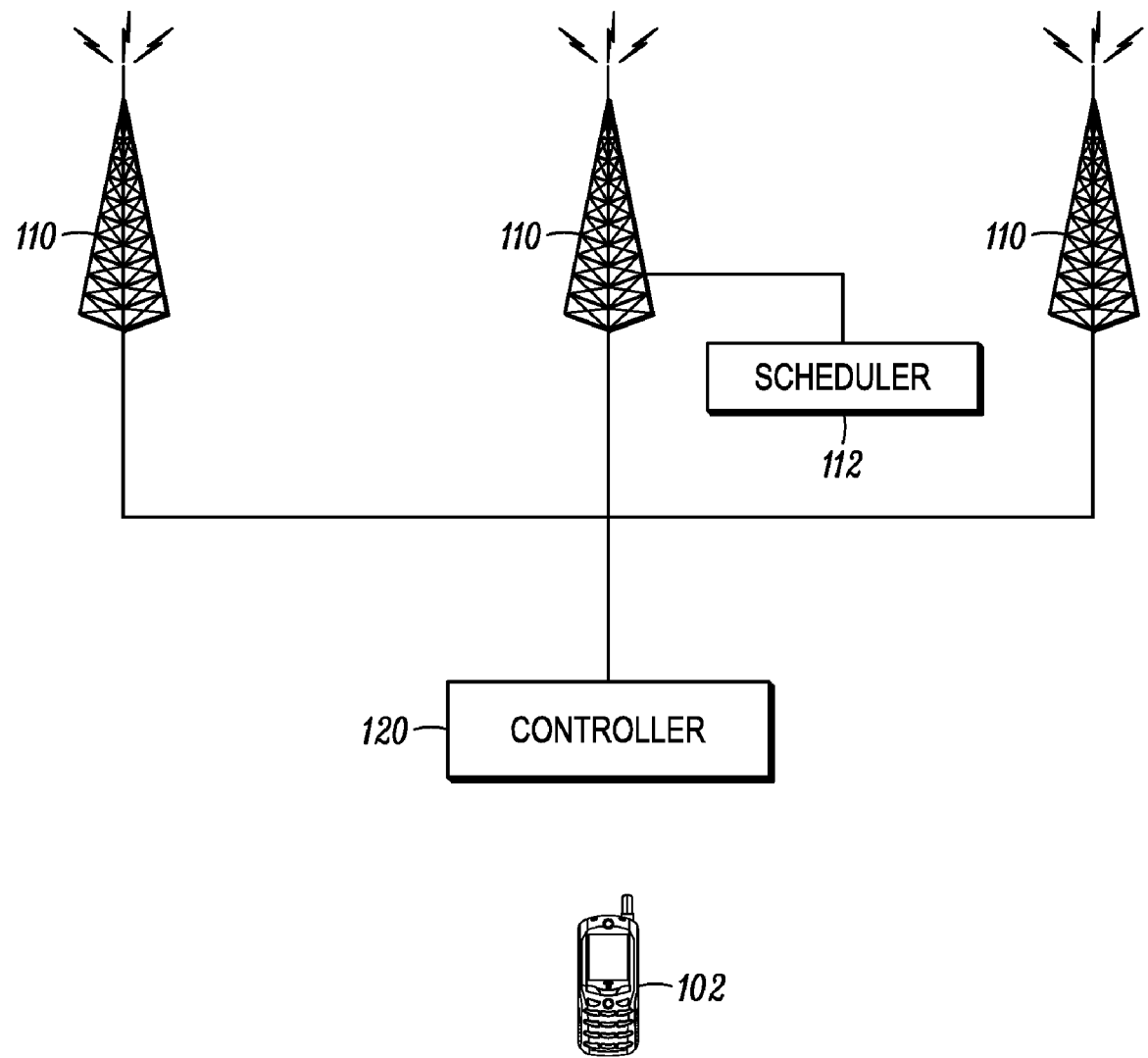
FIG. 1 is an illustrative wireless communication network.

FIG. 1 is a wireless digital communication system 100 comprising a plurality of base transceiver stations 110 providing wireless communication service, including voice and/or data service, to wireless terminals 102 over corresponding regions or cellular areas. The base transceiver stations, also referred to by other names such as a "Node B" depending on the system type, are communicably coupled to a controller 120 and to other entities that are not shown but are well known by those having ordinary skill in the art. In FIG. 1, each base transceiver station includes a scheduling entity 112 for radio resource scheduling among the wireless communication terminals within the network. Exemplary communication systems include, but are not limited to, developing Universal Mobile Telecommunications System (UMTS) networks, Evolved Universal Terrestrial Radio Access (E-UTRA) networks, and other OFDM based networks.

E-UTRA and other communication protocols are being developed to support delivery of voice services over a packet domain, in contrast to the traditional support of voice over a circuit switched domain. Thus there is interest in schemes that support voice traffic over a shared radio channel, wherein multiple users share time and frequency resources of the radio interface. In order to attain a significant increase in capacity with E-UTRA, efficient radio resource allocation schemes will likely be required to accommodate voice traffic. In these and other applications, including data applications, it is generally desirable that control signaling overhead be minimized while offering flexibility to the scheduler at the network. In a general sense, it is useful to define a mechanism to efficiently signal resource allocation and related control channel information to multiple terminals applicable to a broadband wireless system, relying on shared channels for delivery of any service using packet based transmission.

Figure 2:
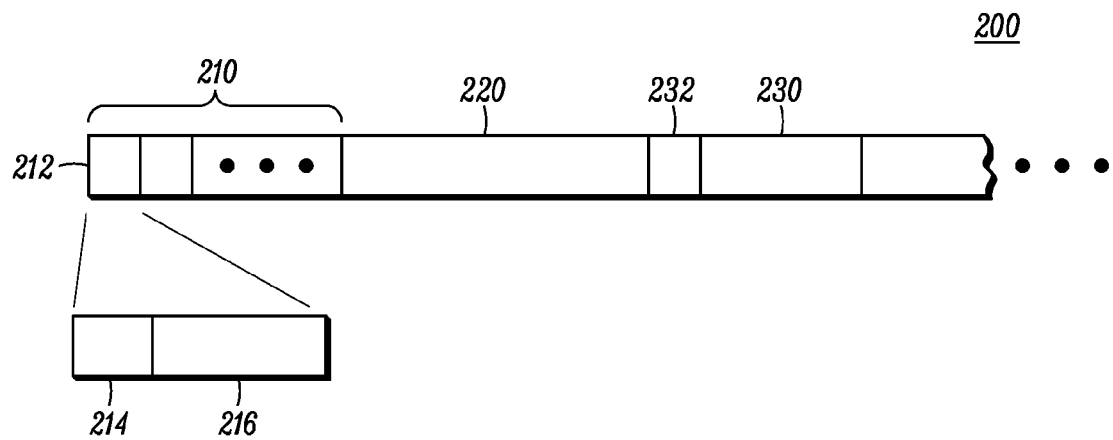
FIG. 2 is an illustrative sequence of radio frames each comprising a plurality of sub-frames.

FIG. 2 illustrates a sequence of radio frames 200 useful for communicating in wireless digital communication systems. In FIG. 2, the frame sequence generally comprises a plurality of frames 210, 220, 230, wherein each frame comprises a plurality of sub-frames. For example, frame 210 comprises a sub-frame 212 having a resource assignment control channel portion within a control channel portion 214 and a data channel portion 216. In some embodiments, the frames constitute a repeating sequence of frames, wherein the repeating sequence may be a periodic or an aperiodic repeating sequence.

Figure 3:
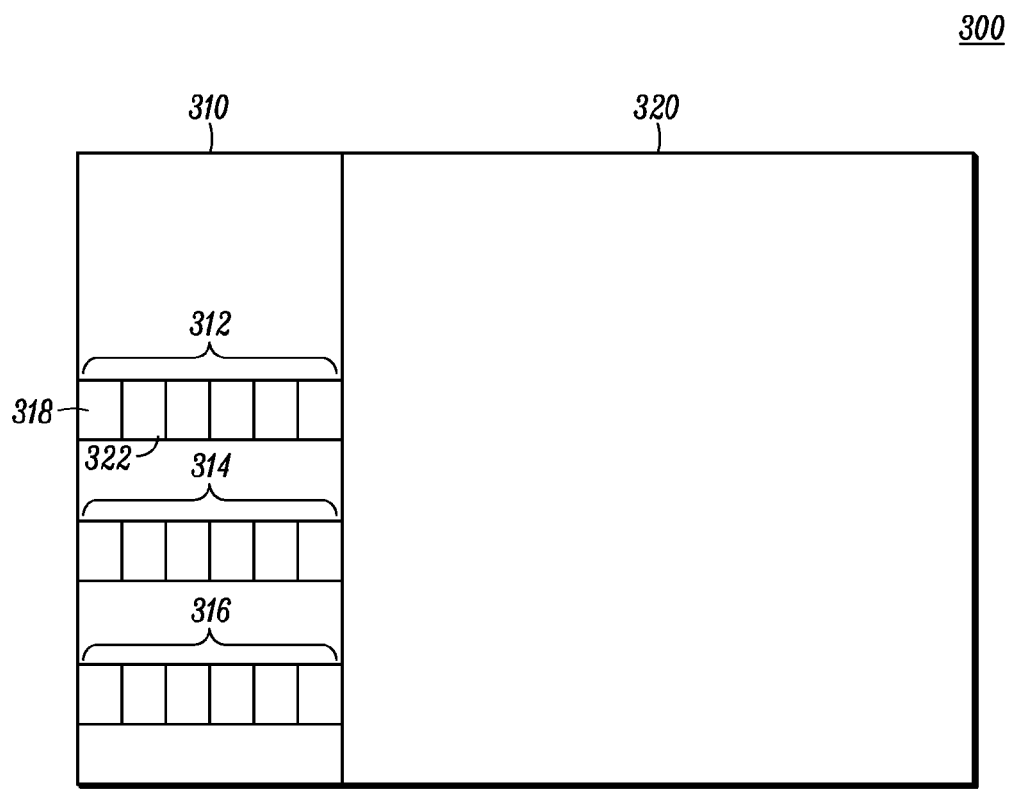
FIG. 3 is an illustrative sub-frame including control and data channel portions.

FIG. 3 is a more detailed illustration of a sub-frame 300 comprising a resource assignment control portion 310 and a data portion 320. The resource assignment control portion 310 includes downlink resource assignment information 312 and uplink resource assignment information 314 and feedback information 316, among other information. The feedback information may relate to uplink and/or downlink communications, as discussed further below.

In one embodiment, a scheduler or other infrastructure entity in a wireless communication system groups wireless communication terminals in one or more groups. In one embodiment, the terminals are grouped based on radio channel conditions associated with the terminals, for example, channel quality information reported by the terminals, Doppler information reported by the terminal, distance from the serving cell, among other conditions. In another embodiment, the terminals are grouped based on a terminal operating characteristic other than participation in a common communication session. Exemplary terminal operating characteristics include power headroom of the terminal, or macro diversity considerations, terminal capability, service of the terminal, codec rate among other considerations. The groupings of the terminals may also be based on combinations of these and other criteria not specifically disclosed.

Generally, multiple terminals are assigned to corresponding groups. A terminal may be assigned to more than one group. Terminals may also be re-assigned from one group to a different group, for example, based on changing conditions used as criteria for the grouping. The terminal may also request re-assignment to a different group.

A network entity generally assigns one or more control channels to each group for radio resource assignment. Control channels used for radio resource assignments are referred to herein as resource or radio resource assignment control channels, which are distinguished from other types of control channels. Generally, where there are multiple groups, each group has a different control channel or a different combination of control channels assigned thereto. Thus in one embodiment, a first control channel is assigned to a first group and a second control channel is assigned to a second group.

A network entity sends resource assignment control channel information to the terminals in the group wherein the control channel information indicates which frame(s) and corresponding sub-frame(s) the terminals in the group should monitor for radio resource assignments. The terminals in the group thus monitor the control channel(s) associated with the group to which the terminals are assigned. The terminals of the group may determine whether a radio resource has been assigned to the terminal based on information in the resource assignment control channel, as discussed further below. The resource assigned to each terminal may be determined based on an implied or explicit mapping, also discussed further below.

In one embodiment, each of the one or more groups is assigned to less than all sub-frames constituting a particular frame, wherein a radio resource assignment control channel of at least one assigned sub-frame is assigned to each group. Generally different groups are assigned to different sub-frames. In some embodiments, two or more groups may be assigned to the same sub-frame. In embodiments where two or more groups are assigned to the same sub-frame, the groups are assigned to different resource assignment control channels within the same sub-frame.

In FIG. 2, for example, a first control channel associated with a first group is assigned to a corresponding sub-frame 212 of frame 210. Generally, the first group could be assigned to multiple sub-frames in the frame, but not to all sub-frames thereof. Also, generally, each group is assigned to a sub-frame in different frames in the sequence. In FIG. 2, for example, the group may be assigned to sub-frame 212 in frame 210 and to sub-frame 232 in frame 230.

Generally, the frames are part of a repeating sequence of frames for purposes of reading a resource assignment control channel. Each group may thus be assigned to less than all sub-frames constituting a frame in a repeating sequence of frames. In some embodiments, the group/sub-frame assignments are periodic, and in other embodiments the assignments are not periodic. Thus a group may be assigned to the same sub-frame(s) in the same frame in a sequence of multiple frames. For example, a group is assigned to a first sub-frame in a first frame in each sequence of frames. In another embodiment, a group may be assigned to a different sub-frame(s) in the same frame in the sequence of frames. For example, a group is assigned to a first sub-frame in a first frame in the first sequence of frames, and the group is assigned to a second sub-frame in the first frame in the second sequence of frames. In another embodiment, a group is assigned to the same sub-frame(s) in different frames of the sequence of frames. For example, a group is assigned to a first sub-frame in a first frame in the first sequence of frames, and then the group is assigned to the first sub-frame in the second frame in the second sequence of frames. More generally, a group may be assigned to every nth sub-frame in a continuous sequence of frames.

Different types of information may be communicated over the control channel. One type of information is radio resource assignment information. Other types include modulation format, coding rate and HARQ information. Another type of control channel information is feedback, for example, ACK/NACK signaling information. Generally, feedback control information that the terminal sends is on a different control channel than the control channel indicating radio resource assignment. Information not related to a radio resource assignment may be communicated with a radio resource indication, for example, in a radio resource assignment control channel. Alternatively, non-radio resource assignment information may be indicated in a separate portion of a sub-frame, or it may be known a priori by the terminal.

In FIG. 3, for example, feedback control channel information is communicated in bit map 316. Such feedback information, for example, ACK/NACK information, is for previous transmissions by terminals in the group or for prior reception by the terminals in the group for transmissions sent by a network entity. In one embodiment, each terminal in the group is assigned to a location in the bit map, wherein the terminal reads its assigned bit map location in the control channel to obtain the feedback information.

A radio resource may be assigned to at least one terminal of the group with radio resource assignment information in the control channel. Generally, the resource assignment information may simultaneously assign different portions of the radio resource to corresponding terminals of the group. The resource assignments may be for the uplink or the downlink. In FIG. 3, downlink assignments are made by the downlink resource assignment information 312 and uplink assignments are made by the uplink resource assignment information 314. Also, the radio resource assignment information may indicate that the radio resource assigned is located in more than one sub-frame, wherein the assigned sub-frames may be in the same frame or in different frames on either the uplink or downlink. For uplink resource assignments, the radio resource assignment information may provide frame/sub-frame offset information.

In EUTRA, radio resources are assigned as a set of sub-carriers over a timeslot. Thus in E-UTRA scheduling embodiments, for example, the radio resource assignment includes assigning a sub-carrier for a specified time interval. In UMTS scheduling embodiments, the radio resource assignment includes assigning a channelization code in a frequency channel for a specified time interval. These radio resource assignments are only illustrative and not intended to limit the subject matter of the disclosure.

Figure 4:
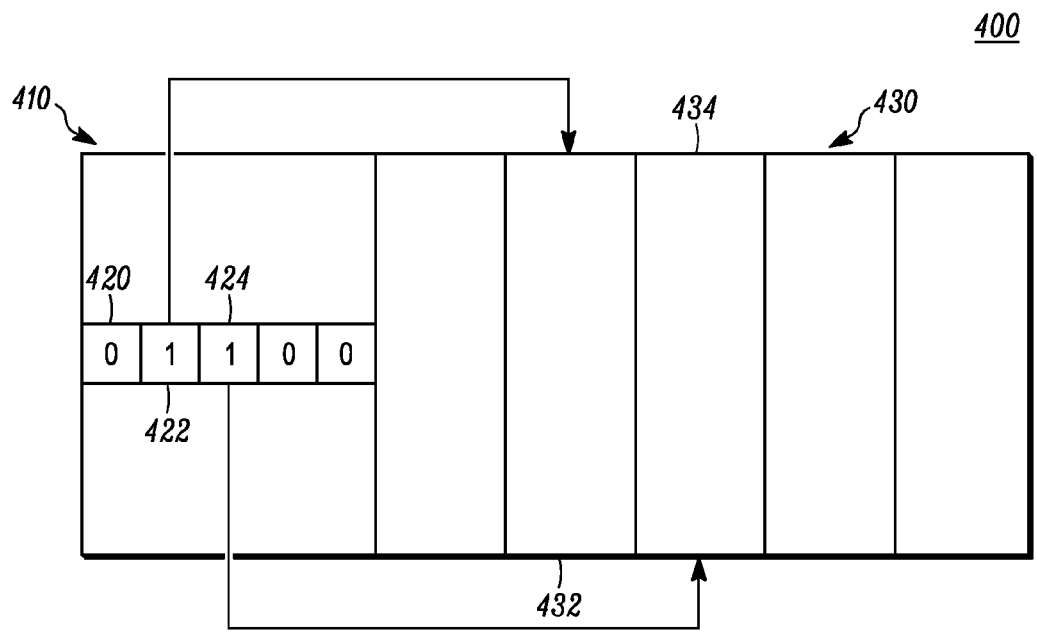
FIG. 4 illustrates a first resource allocation scheme.

Generally, the radio resource assignment information of the control channel identifies at least one terminal to which a radio resource has been assigned. In one embodiment, one or more terminals to which a resource has been assigned are identified by information in the control channel. In another embodiment, the identity is a group identity assigned to at least one terminal. In a more particular embodiment, the terminals to which a resource has been assigned are identified and the order in which the terminals are identified dictates what resource has been assigned. For example, if three of the 5 terminals in a group are identified as having been assigned a resource, by virtue of the terminals having been referenced by a code or other identifier in the control channel assignment information, the first referenced terminal is assigned a first unique predefined radio resource, the second referenced terminal is assigned a second unique predefined radio resource, and the third referenced terminal is assigned a third unique predefined radio resource, wherein the unique predefined radio resources are known a priori by the terminals in the group. Thus in this first embodiment, only the identity of the terminals to which an assignment has been made needs to be communicated by the scheduler to the group. FIG. 4 illustrates a sub-channel 400 comprising a control channel 410 having a resource assignment bit map 420 with locations that are mapped to unique predefined radio resources in the data channel 430. Particularly, resource assignment location 422 is associated with radio resource 432 and bit map location 424 is associated with radio resource 434. Each of the other bit map locations is also associated with a corresponding radio resource.

Figure 5:
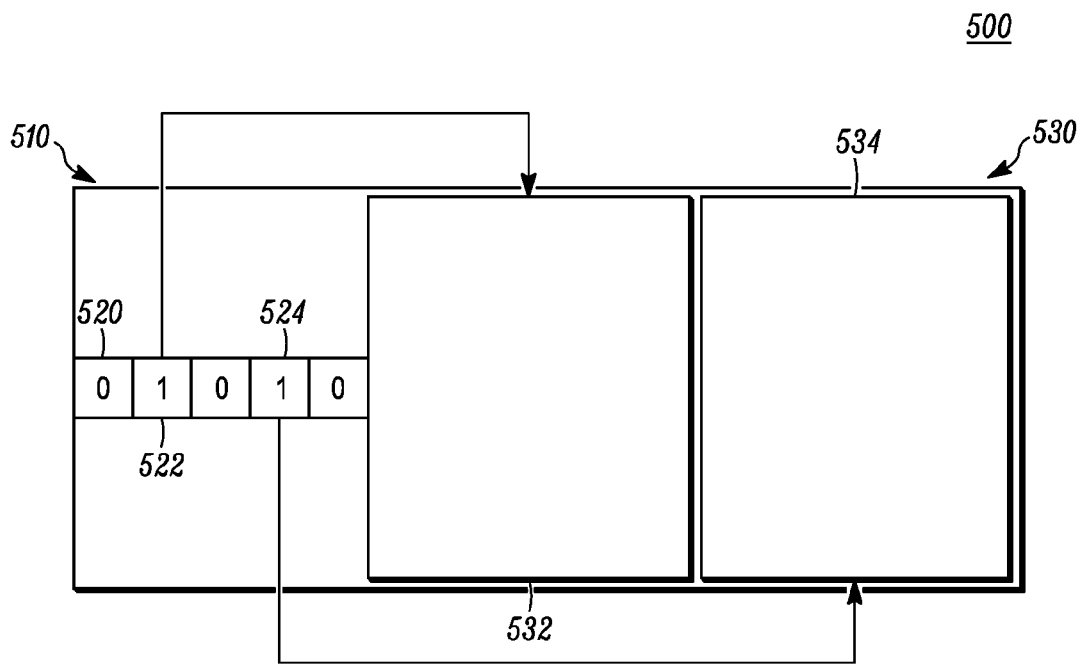
FIG. 5 illustrates another resource allocation scheme.

In an alternative embodiment, the control channel assignment information may include additional information associated with each terminal reference indicating what resource has been assigned. In this alternative embodiment, for each assignment, the control channel information must identify the terminal and identify the radio resource assigned. FIG. 5 illustrates a sub-channel 500 comprising a control channel 510 having a resource assignment bit map 520 with locations that are mapped to unique predefined radio resources in the data channel 530. Particularly, resource assignment location 522 includes additional bits defining radio resource 532 and bit map location 424 includes additional bits defining radio resource 534. The use of additional bits to define the radio resources provides the scheduler with greater flexibility in scheduling and allocating radio resources.

Figure 6:
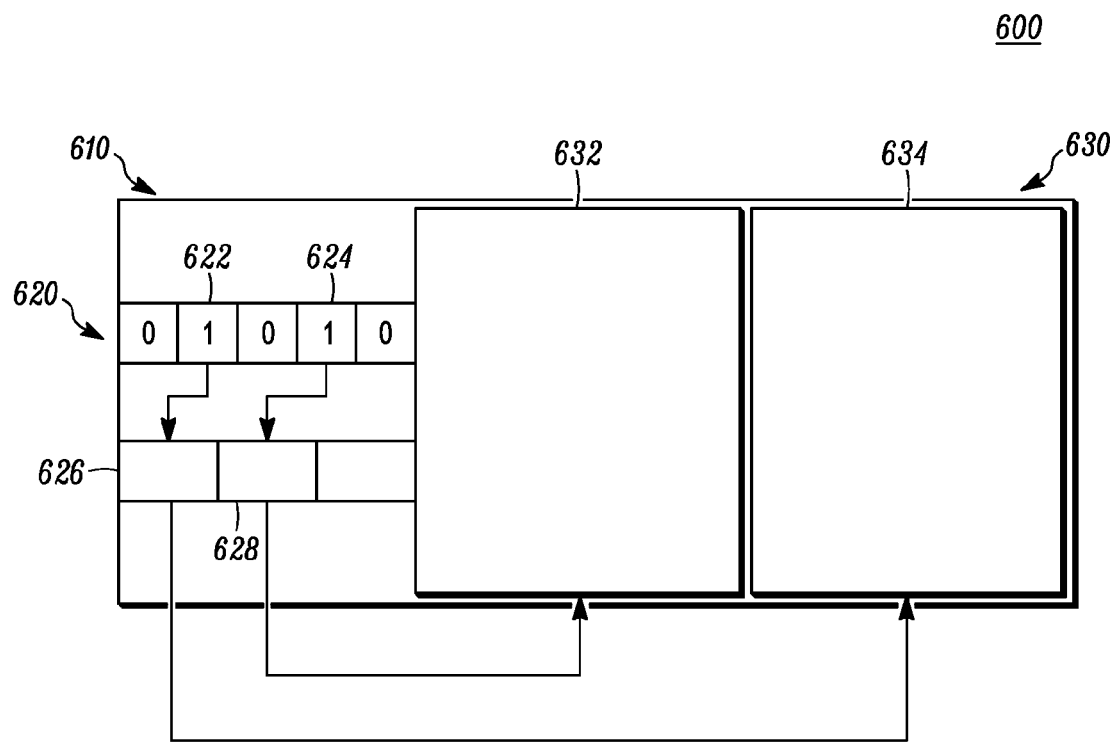
FIG. 6 illustrates yet another resource allocation scheme.

In another alternative embodiment, the control channel assignment information includes additional (pointer) information associated with each terminal indicating where to obtain a resource assignment. FIG. 6 illustrates a sub-channel 600 comprising a control channel 610 having a resource assignment bit map 620 with locations that include pointers to unique predefined radio resources in the data channel 630. Particularly, resource assignment location 622 includes additional bits pointing to location 626, which defines or identifies radio resource 632. The resource assignment location 624 includes additional bits pointing to location 628, which defines or identifies radio resource 634.

In another embodiment, each terminal in the group is associated with a location within a bit map that is part of the assignment control channel. In FIG. 3, for example, five terminals in a group are each associated with a corresponding location in the uplink and downlink resource assignment control channels. For example, the first terminal reads the first location 318, the second terminal reads the second location 322, etc. in each of the uplink and downlink assignment channels. In one embodiment, a unique pre-defined radio resource, known a priori by each terminal, is associated with each bit map location. According to this exemplary embodiment, the bit map merely needs to indicate whether or not an assignment has been made.

In one embodiment, a communication terminal is grouped in first and second groups. For example, one group may be associated with frequency diverse radio resources and another group associated with frequency selective radio resources. In one exemplary application, a terminal is assigned to a frequency selective group for a first transmission and to a frequency diverse group for re-transmissions. Alternatively, a terminal may be assigned to a frequency diverse group for first transmissions and to a frequency selective group for re-transmissions. In another application, one group may be for receiving compressed information and another group for receiving uncompressed information. Multiple grouping may also be based on whether the terminal is communicating both data and voice, and more generally whether the terminal is communicating using both longer and shorter data packets. Also terminals may be grouped in more than one group to address overload conditions. Terminals may also be grouped in multiple groups for other reasons not explicitly identified herein.

The first and second groups to which the terminal is assigned may be assigned to the same sub-frames or to different sub-frames in the same or different frames. In embodiments where terminals are grouped in more than one group, the first and second groups are assigned or associated with less than all sub-frames of the same or different frame.

In one embodiment, a terminal is assigned to first and second groups wherein the first and second groups are assigned to the same sub-frames of the same frame. Such a grouping assignment may be suitable for terminals using compressed and uncompressed communications. This exemplary grouping assignment is also suitable for terminals simultaneously using voice and data services. Another application for this exemplary grouping is to accommodate overload conditions. An overload condition may occur when terminals in a particular group require more resources than are available for the group in a particular sub-frame. Thus where resources are unavailable in a sub-frame associated with the primary group, a terminal may be granted resources in a different sub-frame associated with a secondary group. In one embodiment, a terminal is assigned to first and second groups wherein the first and second groups are assigned to different sub-frames of the same frame. Such a grouping assignment may be suitable for terminals simultaneously using voice and data services. Another application for this exemplary grouping is to accommodate overload conditions. In another embodiment, a terminal is assigned to first and second groups wherein the first and second groups are assigned to the same or different sub-frames of different frames. Such a grouping assignment may also be suitable for terminals simultaneously using voice and data services.

In one embodiment where a terminal is assigned to first and second groups, a control channel is assigned to at least one sub-frame of the first and/or second group. In one embodiment, first and second groups are assigned to common sub-frames of a common frame, and different control channels are assigned to at least one sub-frame in the first and second groups. The control channels may or may not be resource assignment control channels.

In another embodiment where a terminal is assigned to first and second groups, a resource assignment control channel is assigned to at least one sub-frame of the first and/or second group, and a radio resource is assigned to the terminal grouped in the first and second groups over the resource assignment control channel. The assigned radio resource may be in the same sub-frame as the control channel and/or in one or more different sub-frames of the same or different frame as the sub-frame in which the control channel is located. In another embodiment, the assigned radio resource is in at least one of two sub-frame groups, wherein each sub-frame group includes at least one sub-frame and each of the first and second groups is associated with a corresponding one of the sub-frame groups. The assigned radio resource may be in at least one of two different sub-frame groups, or the assigned radio resource may be in two or more different sub-frame groups.

In one embodiment, the wireless communication terminal determines a radio resource assignment based on control channel information on an assigned control channel, wherein the control channel information indicates all possible assignments of first and second radio resources to the terminal. Particularly, either one of the first or second resources may be assigned, or both the first and second resources may be assigned, or neither of the first and second resources may be assigned.

In one embodiment, the radio resource assignment is determined based on control channel information received in first and/or second sub-frames. In one embodiment, for example, an uplink radio resource assignment is determined based on control channel information received in the first sub-frame, and a downlink radio resource assignment is determined based on control channel information received in the second sub-frame. Non-resource assignment information, for example, modulation format, coding rate, etc., may also be communicated over a control channel and determined by the terminal for one or more radio resources assigned to the terminal. In one embodiment, the non-resource assignment information may be located in the data channel portion of a sub-frame, wherein the location of the non-resource assignment information is known to the terminal a priori or information is included in the control channel indicating the location of the non-resource assignment information.

In one embodiment, a wireless communication terminal determines whether it has been assigned first and second radio resources by monitoring first and second corresponding control channels. In one particular embodiment, the terminal determines whether it has been assigned the second radio resource only if the first radio resource was not assigned. In another particular embodiment, the terminal is assigned a first radio resource through a first control channel and, thereafter, the terminal monitors a second control channel only if a condition is not satisfied in connection with the radio resource assigned via the first control channel. For example, if the terminal experiences a failed transmission or reception on the first radio resource, the terminal would monitor the second control channel for an alternate radio resource assignment.

In another embodiment, a wireless communication terminal monitors a first control channel for radio resource assignment information on a wireless communication network and, while monitoring the first control channel, the terminal obtains information for monitoring a second control channel on the same wireless communication network. In one embodiment, the second control channel is different than the first control channel wherein the terminal may monitor one or both of the first and second control channels. In other embodiment, the terminal monitors the second control channel instead of the first control channel, wherein the second control channel is a modification of the first control channel. An exemplary modification is one such that the modified control channel is capable of assigning resources associated with groups to which the terminal has been associated at an infrastructure entity, for example, a base station scheduler. This additional control channel monitoring information may be obtained by reading a broadcast control or other channel, or by receiving a dedicated message. Assignment to a secondary group may be to accommodate services, for example, voice or data, in addition to services already used by the terminal. Such a subsequent assignment may also be for addressing overloading conditions. The terminal may monitor the second channel for radio resource assignments or for other information.

In one embodiment, the terminal determines whether the terminal has been identified, by at least one of two different identities assigned to the terminal, in the control channel information monitored by the terminal. For example, the terminal may be assigned one or more identities by a scheduler, wherein each identity is associated with a corresponding group to which the terminal has been associated by the scheduler. The terminal may thus use the one or more identities to determine which radio resources, for example, uplink, downlink, voice, data, first transmission, re-transmission, etc., have been assigned.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
   receiving a radio frame including a sequence of sub-frames, each sub-frame having a control portion, each control portion including a first control channel and a second control channel;
   monitoring at least a first control channel of a first sub-frame,
   determining whether a first radio resource has been assigned to the terminal by the first control channel of the first sub-frame; and
   monitoring a second control channel of a second sub-frame only if a condition associated with the first control channel of the first sub-frame is satisfied.

2. The method of claim 1, monitoring the second control channel only if a first radio resource is not assigned by the first control channel, wherein the condition is whether a first radio resource is assigned by the first control channel.

3. The method of claim 1, monitoring the second control channel only if the terminal experiences a failed transmission on the first radio resource assigned by the first control channel, wherein the condition is whether the terminal experiences a failed transmission on the first radio resource.

4. The method of claim 1, monitoring the second control channel only if the terminal experiences a failed reception on the first radio resource assigned by the first control channel, wherein the condition is whether the terminal experiences a failed reception on the first radio resource.

5. The method of claim 1, receiving the first control channel and the second control channel in a common sub-frame, wherein the first sub-frame is the same as the second sub-frame.

6. The method of claim 1, receiving the first control channel and the second control channel in different sub-frames, wherein the first sub-frame is different than the second sub-frame.

7. A method in a wireless communication terminal, the method comprising:
- receiving at least two distinct identities assigned by a wireless infrastructure entity;
- monitoring a control region in a radio frame;
- determining whether the terminal has been identified, in the control region, by at least one of the two distinct identities assigned to the terminal;
- determining a type of radio resource assigned to the terminal using the identity with which the terminal has been identified.

8. The method in claim 7, determining a type of radio resource assigned to the terminal includes determining whether the terminal has been assigned a radio resource associated with a first transmission or a re-transmission.

9. The method in claim 7, determining a type of radio resource assigned to the terminal includes determining whether the terminal has been assigned a radio resource associated with a voice transmission or a data transmission.

10. The method in claim 7, determining a type of radio resource assigned to the terminal includes determining whether the terminal has been assigned an uplink radio resource or a downlink radio resource.

11. A method in a wireless communication terminal, the method comprising:
- determining an assignment of a radio resource to the terminal based on information in a control channel associated with a group to which the terminal is assigned by a wireless communication infrastructure entity;
- determining a radio resource mapping for the terminal based on information on the control channel,
- receiving radio resource assignment information, the radio resource information indicating assigned radio resource information that is valid for more than one sub-frame.

12. A method in a wireless communication terminal, the method comprising:
- determining an assignment of a radio resource to the terminal based on information in a control channel associated with a group to which the terminal is assigned by a wireless communication infrastructure entity;
- determining a radio resource mapping for the terminal based on information on the control channel,
- the control channel information including additional information associated with the terminal indicating where to obtain a resource assignment.

* * * * *